Feb. 12, 1929.   1,702,019
C. P. RICKER
MACHINE FOR ASSEMBLING WOODEN SKEWERS OR OTHER ARTICLES
Filed April 23, 1927   2 Sheets-Sheet 1
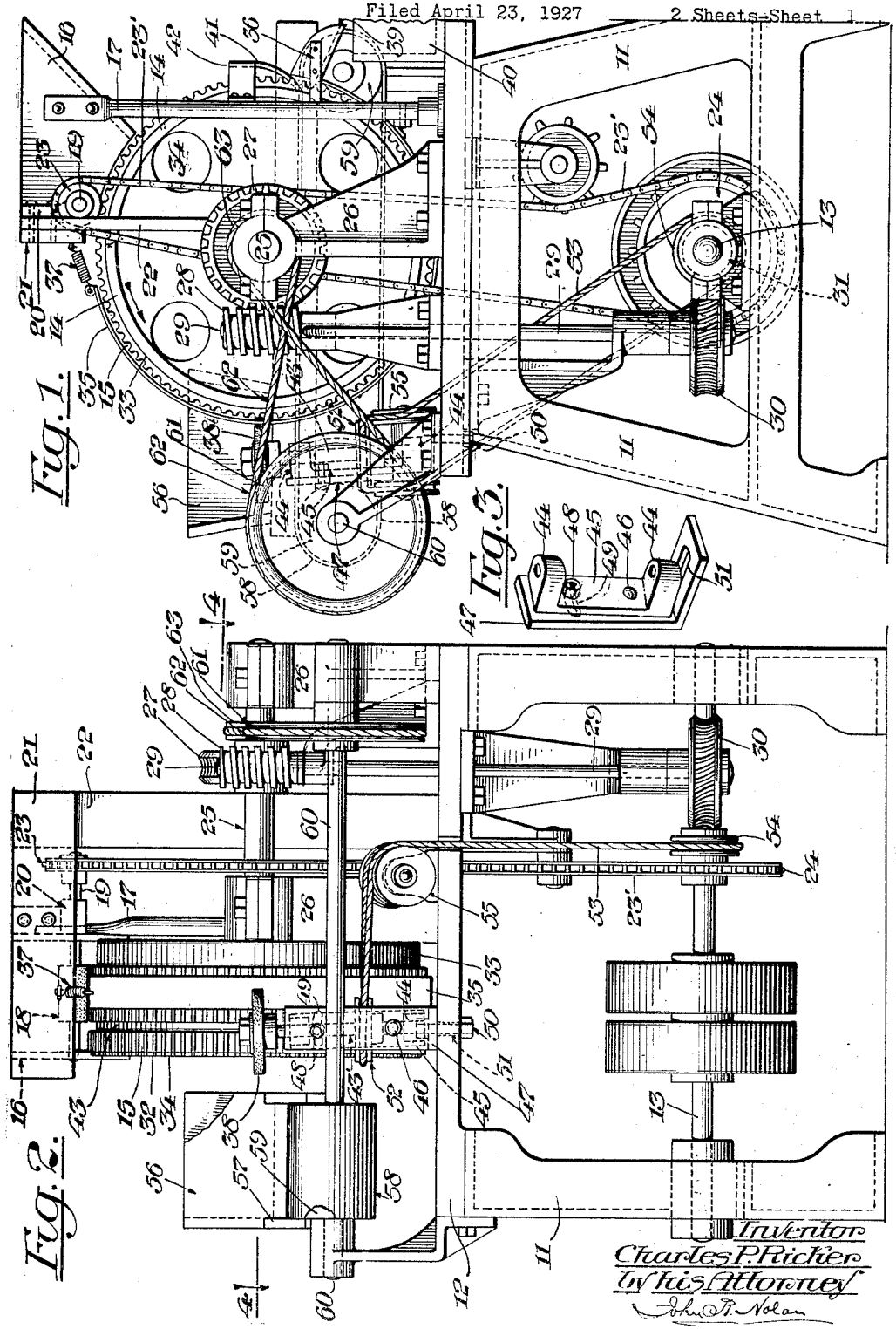
Inventor
Charles P. Ricker
by his Attorney
John P. Nolan Feb. 12, 1929.  C. P. RICKER  1,702,019
MACHINE FOR ASSEMBLING WOODEN SKEWERS OR OTHER ARTICLES
Filed April 23, 1927  2 Sheets-Sheet 2
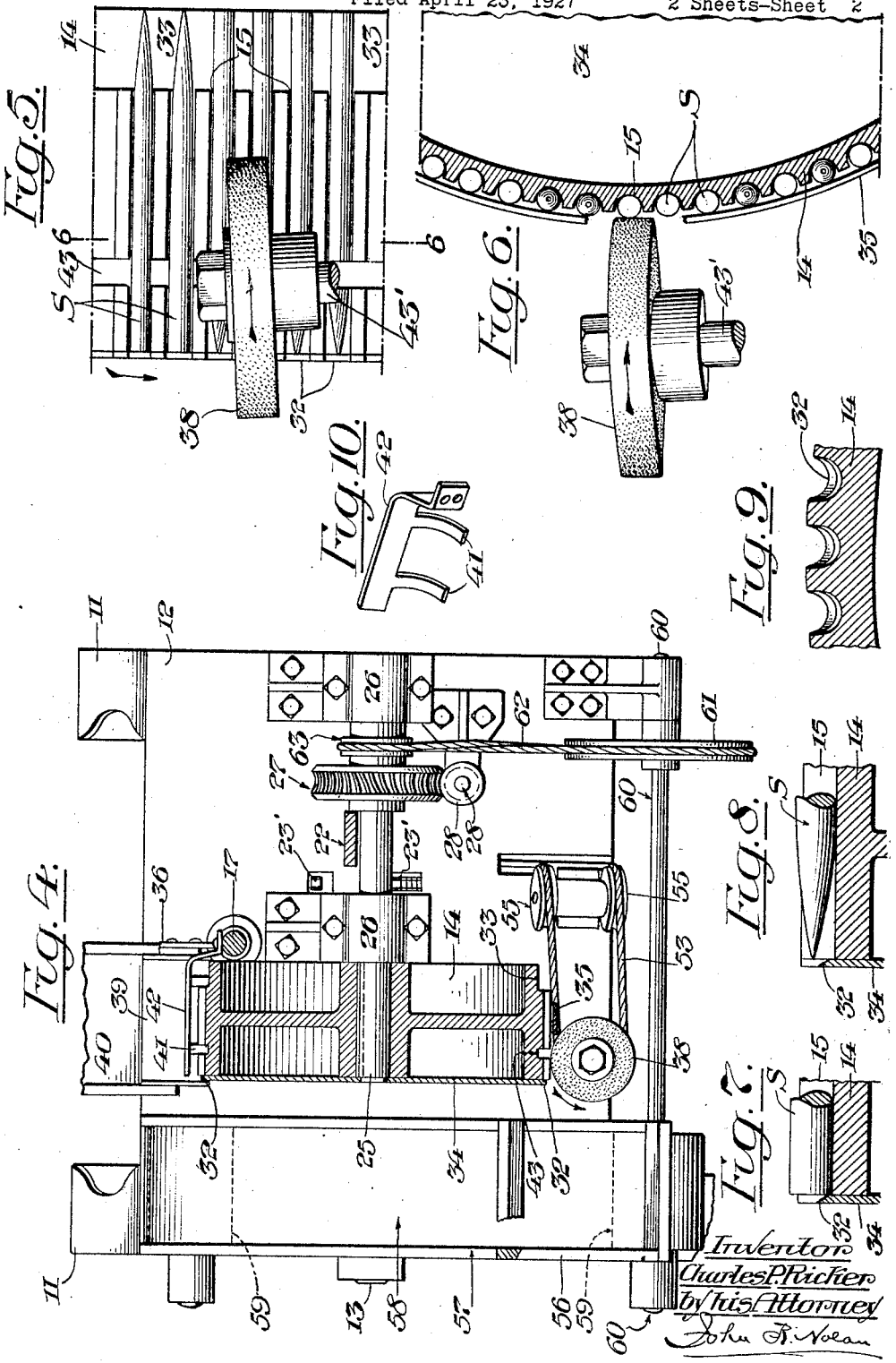

Patented Feb. 12, 1929.

1,702,019

UNITED STATES PATENT OFFICE.

CHARLES P. RICKER, OF DIXFIELD, MAINE, ASSIGNOR TO BERST-FORSTER-DIXFIELD COMPANY, OF DIXFIELD, MAINE, A CORPORATION OF MAINE.

MACHINE FOR ASSEMBLING WOODEN SKEWERS OR OTHER ARTICLES.

Application filed April 23, 1927. Serial No. 185,950.

This invention relates to a machine for assembling elongated pointed or tapering articles with their pointed or tapering portions extending in the same direction.

The invention has been especially designed for assembling wooden skewers, all pointed in one direction, preparatory to their orderly packing in suitable containers, but it is to be understood that the invention may be adapted to and used in connection with machines for properly arranging other elongated articles or objects of generally pointed or tapering configuration.

My invention, broadly considered, comprehends a machine comprising a suitable carrier element having spaced parallel holders to which the articles to be assembled are successively delivered from a suitable source of supply, means whereby a longitudinally acting force is applied to each succeeding article during its travel in the carrier, and means constructed and arranged to oppose the longitudinal movement of such articles that are pointed in one direction, yet permitting the free endwise movement and expulsion of articles that are pointed in the opposite direction.

My invention, more specifically described, comprises a peripherally-grooved carrier wheel to the succeeding grooves of which skewers, or similar articles, are supplied from a suitable hopper within which they are deposited in mass, some pointing in one direction and others in the opposite direction, each of said grooves having an end stop, or barrier, of such character that it can be cleared and crossed by the leading pointed or tapering end of the article when such article is moved longitudinally toward and past the stop, and a rotating ejector wheel arranged in close relation to the carrier wheel and operative to engage the articles in succession in a manner to eject those only whose pointed or tapering ends are directed toward the stops.

The invention also comprises various novel features of construction and combinations of parts, all of which will be hereinafter described, and the scope of the invention then be defined in the appended claims.

In the drawings—

Figure 1 is a side elevation of a machine embodying a form of my invention.

Fig. 2 is an end elevation of the machine.

Fig. 3 is a perspective view of an adjustable bracket bearing for the shaft of the ejector wheel.

Fig. 4 is a horizontal section of the machine, as on the line 4—4 of Fig. 2.

Fig. 5 is a face view of a portion of the wheel, as supplied with skewers, showing the ejector wheel.

Fig. 6 is a vertical section, as on the line 6—6, of Fig. 5.

Figs. 7 and 8 are sectional details of the exit end of one of the skewer holding grooves of the carrier wheel showing the end stop, and indicating the relation thereto of the blunt and pointed ends, respectively, of a skewer.

Fig. 9 is a fragmentary section of the carrier wheel, showing the stops at the exit ends of the skewer holding grooves.

Fig. 10 is a perspective view of the stripper for removing certain of the skewers from the carrier wheel.

Referring to the drawings, 11 designates a supporting frame, including a bed 12; 13 designates a drive shaft journaled in suitably-located bearings in the frame, and 14 designates a travelling carrier comprising, in the present instance, a wheel having in its periphery parallel transverse grooves 15 adapted to be successively supplied with skewers (S) from a suitable hopper 16 under which the wheel rotates.

This hopper, in which the skewers are deposited in mass (some pointing in one direction and others pointing in the opposite direction,) is supported by a post 17 rising from the bed. A small wheel 18 is mounted in the throat of the hopper and parallel to the axis of the carrier wheel 14 insures the entry of skewers individually in and longitudinally of each of the succeeding grooves of the wheel 14. The wheel 18 is fast on a shaft 19 which has its bearings in a bracket 20 on an overhanging bar 21 supported by a standard 22 on the bed. This shaft bears a sprocket wheel 23 which is operatively connected by means of a chain 23' with a sprocket wheel 24 fast on the drive shaft 13. The wheel 18 is rotatable reversely of the carrier wheel in order to prevent the crowding and jamming of the skewers between the opposed faces of the two wheels.

The carrier wheel is fast on a transverse shaft 25 having its bearings in boxes supported by standards 26 on the bed 12. This shaft is provided with a worm wheel 27 in mesh with a worm 28 on the upper end of a vertical shaft 29, which latter shaft in turn is provided at its lower end with a worm wheel 30 in mesh with a worm 31 on the drive shaft, whereby continuous motion is transmitted from the latter shaft to the carrier wheel. Any other suitable means for rotating the carrier wheel may be employed.

The grooves 15 of the carrier wheel open outward at one side of the wheel, i. e., the left hand side as viewed in Figs. 2, 4 and 5, and the bottoms of the open ends of the grooves at such side are provided with teats or projections 32 which serve as stops to bar the exit from the grooves of those skewers that are positioned with their tapering ends pointing inward or to the right, as seen in Figs. 5 and 7, yet permitting the free endwise movement from the grooves of the skewers that are positioned with their tapering ends pointing toward the left, as seen in Fig. 8.

The grooves 15 terminate short of the right hand side of the carrier wheel and are therefore of less length than the skewers, and the plane peripheral portion 33 of said wheel is reduced slightly below the bottom of the grooves, thus facilitating the seating in the grooves of skewers that may be slightly warped or deflected at their ends.

The teats or projections 32 are economically and effectively provided by a peripherally-toothed or serrated disk 34 which is centrally mounted on the shaft 25 and is affixed to the discharging side of the carrier wheel. The interdental spaces of the disk correspond in number with, but are of slightly less depth than, the grooves, so that when the disk and carrier wheel are attached with their respective grooves and spaces in register, the material forming the lower edges of the spaces projects slightly beyond the bottoms of the grooves in the carrier wheel, as indicated in Figs. 7, 8 and 9.

The skewers supplied to the succeeding grooves of the rotating carrier wheel from the hopper, as previously explained, are maintained for an interval of time in the grooves by means of a segmental guard strip 35 which partially encircles the front face of said wheel intermediate the ends of the grooves 15; the lower end of the strip following under the bottom and partly up the back of the carrier wheel and being secured to a laterally-projecting piece 36 on the post 17. The upper end of the guard strip is resiliently attached to the overhanging bar 21 by means of a spring connection 37.

Arranged at the front of the grooved carrier wheel, laterally of the guard strip, is a relatively thin ejector wheel 38, preferably of rubber, which is mounted to rotate laterally of and in close relation to the grooves 15, so that the periphery of the ejector wheel 38 in its rotation progressively contacts with the succeeding skewers which are seated in the grooves 15 as the skewers are carried downward by the carrier wheel. (See Figs. 5 and 6). The ejector wheel 38 rotates in a counterclockwise direction, and hence as each succeeding skewer is presented to its periphery, the ejector wheel tends by rolling frictional contact to thrust the opposing skewer longitudinally to the left of the carrier wheel. Consequently those skewers which point to the left are rapidly ejected over and beyond the stop projections 32 of their respective grooves, while the skewers which point in the opposite direction abut at their larger or blunt ends against the opposing stops and thus remain seated in the grooves until the latter skewers escape the lower end of the guard strip at the back of the carrier wheel, whence they are discharged, all pointed one way, into a chute 39 leading to an underlying receptacle, as 40, from which they may be removed for packing. These skewers are positively stripped from the carrier wheel by a pair of spaced stripper fingers 41 extending from a metal strip 42 which is affixed to the post 17, one of the fingers riding on the reduced portion 33 of the carrier wheel and the other finger riding in a circumferential groove 43 which intersects the series of transverse grooves 15.

Preferably the axis of the ejector wheel 38 is slightly inclined from the vertical in order that the acting peripheral point of the wheel 38 will travel slightly downward correspondingly with the opposing skewer as it is advanced by the carrier wheel, thus ensuring an effective longitudinal action of the ejector wheel on the skewer.

In the present instance the shaft 43' of the ejector wheel is mounted in spaced-apart bearings 44 on a vertical bracket plate 45, which is pivotally mounted adjacent its lower end, as at 46, on an upright 47 on the bed. The upper portion of the plate 45 is secured to the upright by means of a bolt 48 passing through an arcuate slot 49 in the upright 47, thus permitting angular adjustment of the shaft 43' and its wheel 38 to insure the efficient action of the latter on the advancing skewers. The base of the upright 47 is secured to the bed by a bolt 50 which passes through a slot 51 in the bed, thus permitting the adjustment of the upright and its appurtenances toward or from the carrier wheel, as desired.

The shaft 43' is equipped with a sheave 52 about which passes a belt 53 driven from a sheave 54 on the main shaft. A pair of suitably-disposed sheaves 55 are provided for the belt 53 in its passage between the sheaves 52, 54. In this way the ejector wheel is appropriately driven in timed relation to the speed of the carrier wheel, so that the periphery of the ejector wheel contacts with each succeeding skewer seated in a groove of the carrier wheel, as previously mentioned.

Located adjacent the left hand or discharging side of the carrier wheel is a hopper 56 which overlies a trough 57 along the bottom of which extends the upper horizontal run of an off-bearing apron 58 supported on suitably-disposed pulleys 59 mounted at the respective ends of the trough. The pulley 59 adjacent the hopper is fast on a shaft 60 which has its bearings in brackets on the bed, and which shaft is provided with a sheave 61 that is connected by means of a crossed belt 62 with a sheave 63 on the shaft 25 bearing the carrier wheel. Hence during the rotation of the shaft 25 motion is transmitted therefrom to the shaft 60 and its pulley 59, thereby impelling the apron 58.

The upper portion of the side of the hopper 56 adjacent the carrier wheel is open, so that as the skewers are ejected points outward from the carrier wheel, by the action of the rotating ejector wheel 38, such skewers are thrown into the hopper and upon the underlying apron 58. These skewers, all pointed one way, are carried along the trough by the apron from which they may be manually removed for convenient packing in suitable containers.

I claim—

1. The combination of a carrier element having a succession of spaced parallel holders for elongated pointed or tapering articles, means adjacent the path of the holders for exerting longitudinal force on each succeeding article to urge it toward one side of the carrier element, and means constructed and arranged to oppose the longitudinal movement of each article that is pointed away from such side of the carrier element, yet permitting the free longitudinal movement of each article that is pointed in the opposite direction.

2. The combination of a carrier element having a succession of spaced parallel holders for elongated pointed or tapering articles, means including a rotary ejector mounted adjacent the path of the holders and operative to contact with each succeeding article and urge it longitudinally toward one side of the carrier element, and means constructed and arranged to oppose the longitudinal movement of each article that is pointed away from such side of the carrier element, yet permitting the free longitudinal movement of each article that is pointed in the opposite direction.

3. The combination of a carrier element having a succession of spaced parallel holders for elongated pointed or tapering articles, means adjacent the path of the holders for exerting longitudinal force on each succeeding article to urge it toward one side of the carrier element, and means constructed and arranged to oppose the longitudinal movement of each article that is pointed away from such side of the carrier element, yet permitting the free longitudinal movement of each article that is pointed in the opposite direction, said latter means comprising a series of projections at the exit ends of the respective holders.

4. The combination of a carrier element having a succession of spaced parallel holders for elongated pointed or tapering articles, means including a rotary ejector mounted adjacent the path of the holders and operative to contact with each succeeding article and urge it longitudinally toward one side of the carrier element, and means constructed and arranged to oppose the longitudinal movement of each article that is pointed away from such side of the carrier element, yet permitting the free longitudinal movement of each article that is pointed in the opposite direction, said latter means comprising a series of projections at the exit ends of the respective holders.

5. The combination with a carrier wheel having a succession of transverse peripheral article holders, and means for supplying elongated tapering articles to the successive holders, of means including a rotary ejector mounted adjacent the path of the holders and operative to contact with each succeeding article and urge it longitudinally toward one side of the carrier wheel, and means constructed and arranged to oppose the longitudinal movement of each article that is pointed away from such side of the carrier wheel, yet permitting the free longitudinal movement of each article that is pointed in the opposite direction.

6. The combination with a carrier wheel having a succession of transverse peripheral article holders, and means for supplying elongated tapering articles to the successive holders, of means including a rotary ejector having a slightly inclined axis adjacent the path of the holders and being operative to contact with each succeeding article and urge it longitudinally toward one side of the carrier wheel, and means constructed and arranged to oppose the longitudinal movement of each article that is pointed away from such side of the carrier, yet permitting the free longitudinal movement of each article that is pointed in the opposite direction.

7. The combination with a carrier element having a succession of spaced parallel holders for elongated pointed or tapering articles, a rotary ejector mounted adjacent the path of the holders and operative to contact with each succeeding article and urge it longitudinally toward one side of the carrier element, means for adjustably supporting said ejector whereby its axis of rotation can be angularly varied in respect to the longitudinal axis of the opposing article, and means constructed and arranged to oppose the longitudinal movement of each article that is pointed in the opposite direction.

8. The combination with a carrier wheel having a succession of transverse peripheral article holders and having also a circumferential groove intersecting said holders, and means for supplying elongated tapering articles to the successive holders, of means including a rotary ejector mounted adjacent the path of the circumferential groove and operative to contact with each succeeding article and urge it longitudinally toward one side of the carrier wheel, and means constructed and arranged to oppose the longitudinal movement of each article that is pointed away from such side of the carrier wheel, yet permitting the free longitudinal movement of each article that is pointed in the opposite direction.

9. The combination with a carrier wheel having a succession of transverse peripheral grooves, means for supplying elongated tapering articles to the successive grooves, and means for retaining said articles in the grooves through an extended path of travel, of means including a rotary ejector mounted adjacent said path and operative to contact with each succeeding article and urge it longitudinally toward one side of the carrier wheel, and means constructed and arranged to oppose the longitudinal movement of each article that is pointed away from such side of the carrier wheel, yet permitting the free longitudinal movement of each article that is pointed in the opposite direction.

10. The combination with a carrier wheel having a succession of transverse peripheral grooves, means for supplying elongated tapering articles to the successive grooves, and means for retaining said articles in the grooves through an extended path of travel, of means including a rotary ejector mounted adjacent said path and operative to contact with each succeeding article and urge it longitudinally toward one side of the carrier wheel, means constructed and arranged to oppose the longitudinal movement of each article that is pointed away from such side of the carrier wheel, yet permitting the free longitudinal movement of each article that is pointed in the opposite direction, and means adapted to receive and maintain in orderly position the articles ejected from the carrier wheel by the ejector.

11. The combination with a carrier wheel having a succession of transverse peripheral grooves, means for supplying elongated tapering articles to the successive grooves, and means for retaining said articles in the grooves through an extended path, of means including a rotary ejector mounted adjacent said path and operative to contact with each succeeding article and urge it longitudinally toward one side of the carrier wheel, means constructed and arranged to oppose the longitudinal movement of each article that is pointed away from such side of the carrier wheel, yet permitting the free longitudinal movement of each article that is pointed in the opposite direction, and means including an off-bearing apron adapted to receive and maintain in orderly position the articles ejected from the carrier wheel by the ejector.

12. The combination with a carrier wheel having a succession of transverse peripheral grooves, means for supplying elongated tapering articles to the successive grooves, and means for retaining said articles in the grooves through an extended path of travel, of means including a rotary ejector mounted adjacent said path and operative to contact with each succeeding article and urge it longitudinally toward one side of the carrier wheel, means constructed and arranged to oppose the longitudinal movement of each article that is pointed away from such side of the carrier wheel, yet permitting the free longitudinal movement of each article that is pointed in the opposite direction, and means comprising a hopper, trough and off-bearing apron adapted to receive the articles ejected from the carrier wheel by the ejector.

13. The combination with a carrier wheel having a succession of transverse peripheral grooves for the reception of tapering articles, stop projections at the exit ends of the grooves, means for supplying the said articles to the successive grooves, and a rotary ejector mounted adjacent the path of the grooves and operative to contact with each succeeding article and urge it longitudinally toward the adjacent projection.

14. The combination with a carrier wheel having a succession of transverse peripheral grooves for the reception of tapering articles, a member at one end of the carrier wheel having peripheral spaces in register with the said grooves, the material forming the bottom edges of said spaces extending radially beyond the bottoms of the respective grooves and affording stop projections, means for supplying articles to the successive grooves, and a rotary ejector mounted adjacent the path of the grooves and operative to contact with each succeeding article and urge it longitudinally toward the adjacent projection.

15. The described carrier wheel for elongated tapering articles, said wheel comprising a body having transverse peripheral grooves, and a peripherally toothed member at one end of said body, the interdental spaces of said member registering with the grooves of the body, and the material forming the bottom edges of said spaces extending radially beyond the bottoms of the respective grooves to afford end stops for the blunt or larger ends of the articles contained in the grooves.

16. The combination with a carrier element having a succession of spaced parallel holders for elongated pointed or tapering articles, means adjacent the path of the holders for exerting longitudinal force on each succeeding article to urge it toward one side of the carrier element, means constructed and arranged to oppose the longitudinal movement of each article that is pointed away from such side of the carrier element, yet permitting the free longitudinal movement and discharge of each article that is pointed in the opposite direction, means to receive the articles thus discharged from the carrier element, means for subsequently removing the remaining articles from the carrier element, and means for receiving the latter articles.

Signed at New York in the county and State of New York this 21st day of April, A. D. 1927.

CHARLES P. RICKER.